(12) United States Patent
Subbiah

(10) Patent No.: US 11,012,364 B2
(45) Date of Patent: May 18, 2021

(54) AGGREGATED LINK FLOW CONTROL SYSTEM

(71) Applicant: Dell Products L.P., Round Rock, TX (US)

(72) Inventor: Raja Subbiah, Tamilnadu (IN)

(73) Assignee: Dell Products L.P., Round Rock, TX (US)

(*) Notice: Subject to any disclaimer, the term of this patent is extended or adjusted under 35 U.S.C. 154(b) by 89 days.

(21) Appl. No.: 16/157,613

(22) Filed: Oct. 11, 2018

(65) Prior Publication Data

US 2020/0120035 A1  Apr. 16, 2020

(51) Int. Cl.
*H04L 12/891* (2013.01)
*H04L 12/751* (2013.01)

(52) U.S. Cl.
CPC .............. *H04L 47/41* (2013.01); *H04L 45/02* (2013.01)

(58) Field of Classification Search
None
See application file for complete search history.

(56) References Cited

U.S. PATENT DOCUMENTS

2016/0043933 A1* 2/2016 Gopalarathnam ...... H04L 45/22
709/226

* cited by examiner

*Primary Examiner* — Kouroush Mohebbi
(74) *Attorney, Agent, or Firm* — Haynes and Boone, LLP

(57) ABSTRACT

An aggregated link flow control system includes a first networking device having a plurality of peer ports and a second networking device that includes a first port having a first flow control configuration. The first port is coupled to the first networking device via a first peer port of the plurality of peer ports. The second networking device includes a second port having a second flow control configuration. The second port is coupled to the first networking device via a second peer port of the plurality of peer ports. The second networking device groups the first port and the second port as an aggregated link interface. The second networking device determines that the first flow control configuration of the first port is compatible with a third flow control configuration of the first peer port and, in response, provides a data flow for the aggregated link interface through the first port.

20 Claims, 15 Drawing Sheets

AGGREGATED LINK FLOW CONTROL SYSTEM

BACKGROUND

The present disclosure relates generally to information handling systems, and more particularly to controlling a flow through an aggregated link in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, router devices, and/or other networking devices known in the art, sometimes utilize data buffers to temporarily store data for subsequent routing of that data through a network. For example, different data flows may have their data temporarily stored in a data buffer of a networking device as part of a buffer pool, with the memory of the networking device configured with a plurality of different buffer pools (e.g., a lossless buffer pool, a "lossy" buffer pool, etc.). However, in relatively high data traffic situations, the utilization of a buffer pool in a networking device may reach a level that impacts data flows network-wide and across multiple buffer pools/data queues provided for different networking device ports. Conventional solutions to such network congestion include flow control mechanisms such as Priority Flow Control (PFC), which prioritizes particular data flows over others.

Networking devices may also group multiple physical links between networking devices as an aggregated link interface (e.g., a Link Aggregation Group (LAG)) that is presented as a single, logical interface such that data flows between the networking devices may be provided on each of the physical links that are included in the aggregated link interface. Such aggregated link interfaces improve reliability of, and relieve congestion for, data flows between the networking devices. In addition, each physical link in the aggregated link interface may include a flow control configuration such as a PFC priority. However, flow control configurations for each of the physical links may be different, which results in inconsistent treatment of data flows egressing out of the aggregated link interface. Such inconsistent treatment may be undesirable for the data flows that are provided through the aggregated link interface. For example, lossless data flows (e.g., Fibre Channel over Ethernet (FCoE) traffic) may be provided over a physical link of the aggregated link interface that includes a flow control configuration is not configured for lossless data flows. As a result, lossless data flows may experience dropped packets.

Accordingly, it would be desirable to provide an improved aggregated link flow control system.

SUMMARY

According to one embodiment, an information handling system (IHS) includes a plurality of ports; a processing system that is coupled to the plurality of ports; and a memory system that is coupled to the processing system and that includes instructions that, when executed by the processing system, cause the processing system to provide an aggregated link flow control engine that is configured to: add a first port of the plurality of ports having a first flow control configuration to an aggregated link interface, wherein the first port is coupled to a first networking device via a first peer port of a plurality of peer ports on the first networking device; and add a second port of the plurality of ports having a second flow control configuration to the aggregated link interface, wherein the second port is coupled to the first networking device via a second peer port of the plurality of peer ports; and determine that the first flow control configuration of the first port is compatible with a third flow control configuration of the first peer port and, in response, provide network traffic for the aggregated link interface through the first port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
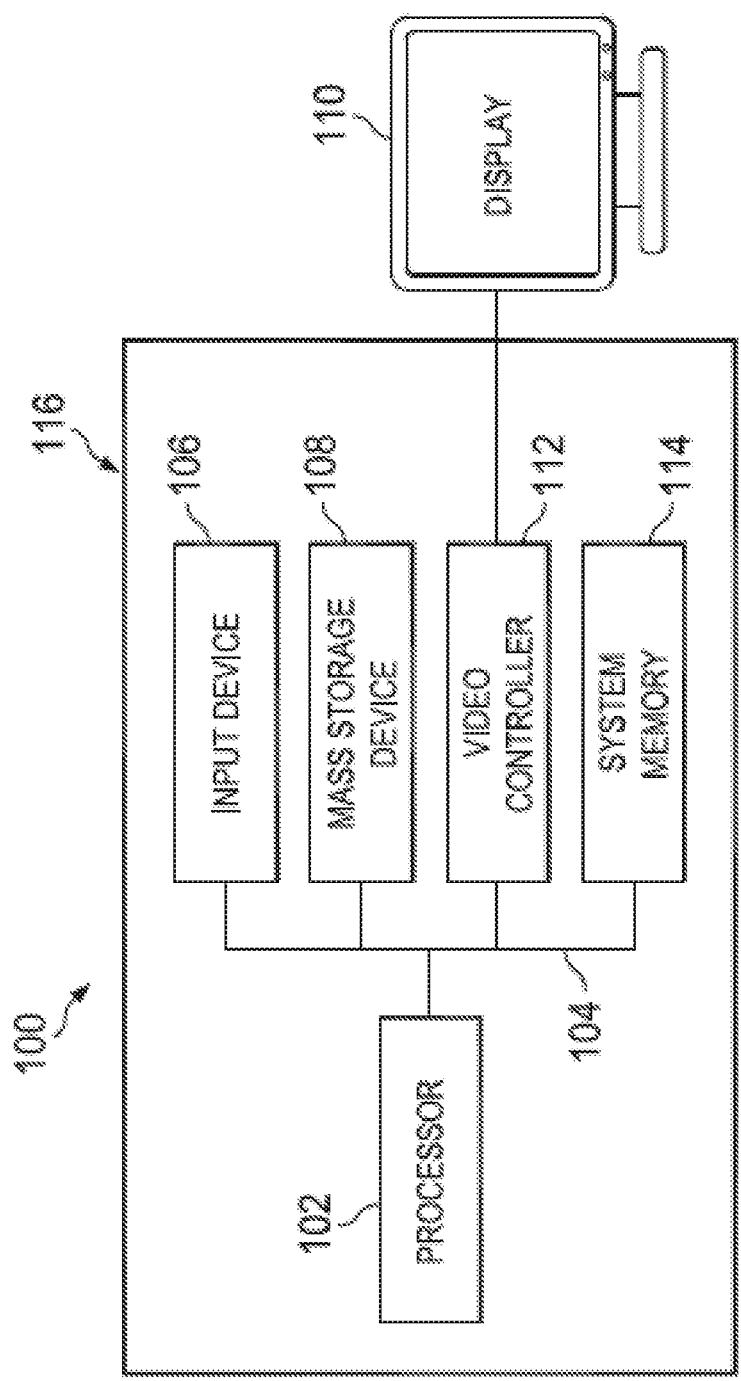
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
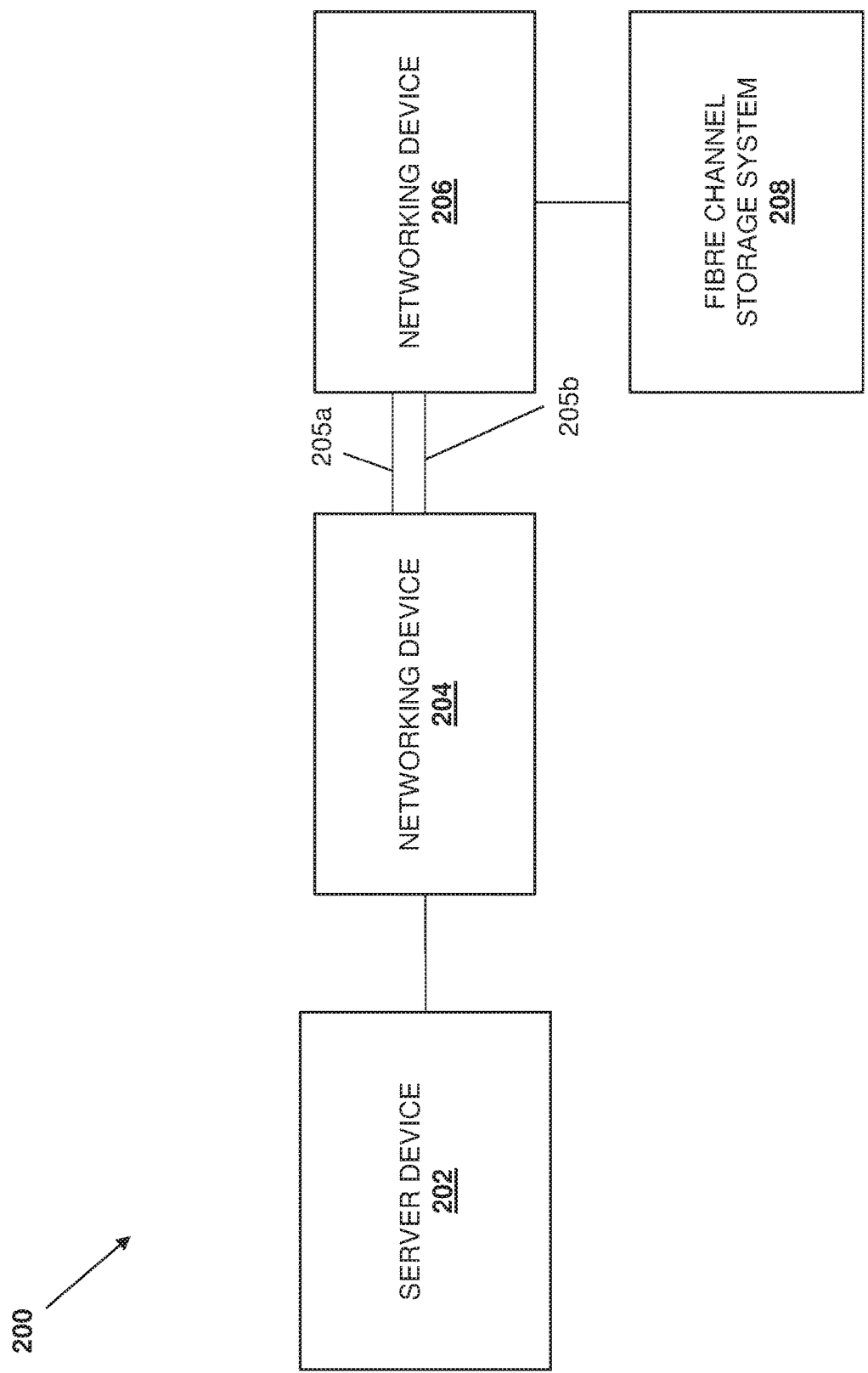
FIG. 2 is a schematic view illustrating an embodiment of an aggregated link flow control system.

Referring now to FIG. 2, an embodiment of an aggregated link flow control system 200 is illustrated. In the illustrated embodiment, the aggregated link flow control system 200 includes a server device 202 that may be the IHS 100 discussed above with reference to FIG. 1 and/or that may include some or all of the components of the IHS 100. For example, the server device 202 may be one or more servers in a server rack or server chassis, and one of skill in the art in possession of the present disclosure will recognize that any number of servers may be provided in the aggregated link flow control system 200 and may operate similarly to the server devices discussed below. In the illustrated embodiment, the server device 202 is coupled to a networking device 204 that may be the IHS 100 discussed above with reference to FIG. 1 and/or that may include some or all of the components of the IHS 100. For example, the networking device 204 may be provided by a switch device, a router device, and/or other networking devices that would be apparent to one of skill in the art in possession of the present disclosure. In a specific example, the networking device 204 may be provided an Fibre Channel over Ethernet (FCoE) networking device that forwards FCoE communications to a Fibre Channel (FC) Storage Area Network (SAN), receives FCOE communications from the FC SAN or receives FC communications, converts those FC communications to Ethernet communications for forwarding to the server device 202, and/or performs other FCoE networking device functionality that would be apparent to one of skill in the art in possession of the present disclosure.

In the illustrated embodiment, the networking device 204 is coupled by a plurality of links (e.g., a link 205a and a link 205b) to a networking device 206 that may be the IHS 100 discussed above with reference to FIG. 1 and/or that may include some or all of the components of the IHS 100. For example, the networking device 206 may be provided by a switch device, a router device, and/or other networking devices that would be apparent to one of skill in the art in possession of the present disclosure. In a specific example, the networking device 206 may be provided by an FCoE networking device that receives FCoE communications from the networking device 204, converts those FCoE communications to FC communications, forwards the FC communications to the FC SAN, receives FC communications from the FC SAN, converts those FC communications to Ethernet communications for forwarding to the server device 202 via the networking device 204, and/or performs other FCoE networking device functionality that would be apparent to one of skill in the art in possession of the present disclosure.

In the illustrated embodiment, the networking device 206 is coupled to an FC storage system 208 that may be the IHS 100 discussed above with reference to FIG. 1 and/or that may include some or all of the components of the IHS 100. For example, the FC storage system 208 may be provided by a FC SAN that is configured to receive FC communications converted from FCoE communications from the server device 202 through the networking device 206, send FC communications to the server device 202 through the networking device 206, and/or perform a variety of other FC storage system functionality that would be apparent to one of skill in the art in possession of the present disclosure. While a specific aggregated link flow control system 200 is illustrated and described below, one of skill in the art in possession of the present disclosure will recognize that the teachings of the present disclosure will be beneficial for a variety of aggregated link flow control system that would be apparent to one of skill in the art in possession of the present disclosure and, as such, a wide variety of modifications to the number, types, and configuration of devices in the aggregated link flow control system 200 will fall within the scope of the present disclosure as well. For example, in the illustrated embodiment, the aggregated link flow control system 200 includes a plurality of networking devices, and one of skill in the art in possession of the present disclosure will recognize that the networking devices may be coupled to server devices, client devices, storage devices, and/or any other devices that would be apparent to one of skill in the art in possession of the present disclosure.

Figure 3:
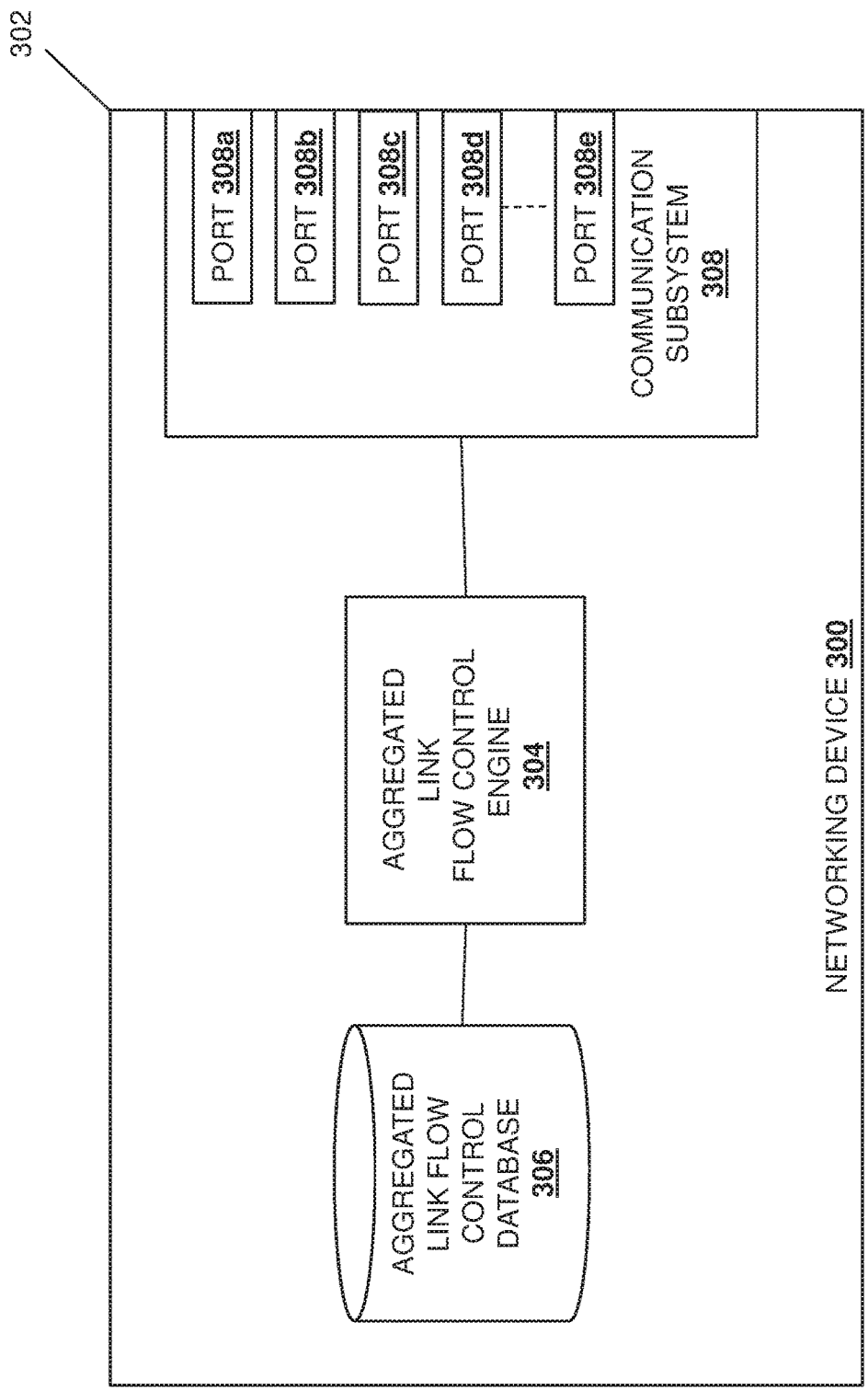
FIG. 3 is a schematic view illustrating an embodiment of a networking device used in the aggregated link flow control system of FIG. 2.

Referring now to FIG. 3, an embodiment of a networking device 300 is illustrated that may be any or all of the networking devices 204 and 206 discussed above with reference to FIG. 2. As such, the networking device 300 may be provided by the IHS 100 discussed above with reference to FIG. 1, and/or may include some or all of the components of the IHS 100, and in specific examples may be provided by a switch device, a router device, and/or other networking devices that would be apparent to one of skill in the art in possession of the present disclosure. In the illustrated embodiment, the networking device 300 includes a chassis 302 that houses the components of the networking device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is couple to the processing system and that include instructions that, when executed by the processing system, cause the processing system to provide an aggregated link flow control engine 304 that is configured to perform the functionality of the aggregated link flow control engines and networking devices discussed below.

The chassis 302 may also house a storage device (not illustrated, but which may include the storage device 108 discussed above with reference to FIG. 1) that is coupled to the aggregated link flow control engine 304 (e.g., via a coupling between the storage system and the processing system) and that stores a aggregated link flow control database 306 that is configured to store any of the information utilized as discussed below. The chassis 302 may also house a communication subsystem 308 that is coupled to the aggregated link flow control engine 304 (e.g., via a coupling between the communication subsystem 308 and the processing system), and that may be provided by a Network Interface Controller (NIC), a wireless communication system (e.g., a BLUETOOTH® communication system, a WiFi communication system, a Near Field Communication (NFC) system, etc.), and/or other communication components that would be apparent to one of skill in the art in possession of the present disclosure. For example, in the illustrated embodiment, the communication subsystem 308 includes a plurality of ports (e.g., the ports 308*a*, 308*b*, 308*c*, 308*d*, and up to 308*e*) that may be coupled to another networking device, a storage system, and/or a server device as discussed below. While a specific networking device 300 has been illustrated and described, one of skill in the art in possession of the present disclosure will recognize that networking devices may include variety of components and/or component configurations for providing conventional networking device functionality, as well as the functionality described below, while remaining within the scope of the present disclosure.

Figure 4:
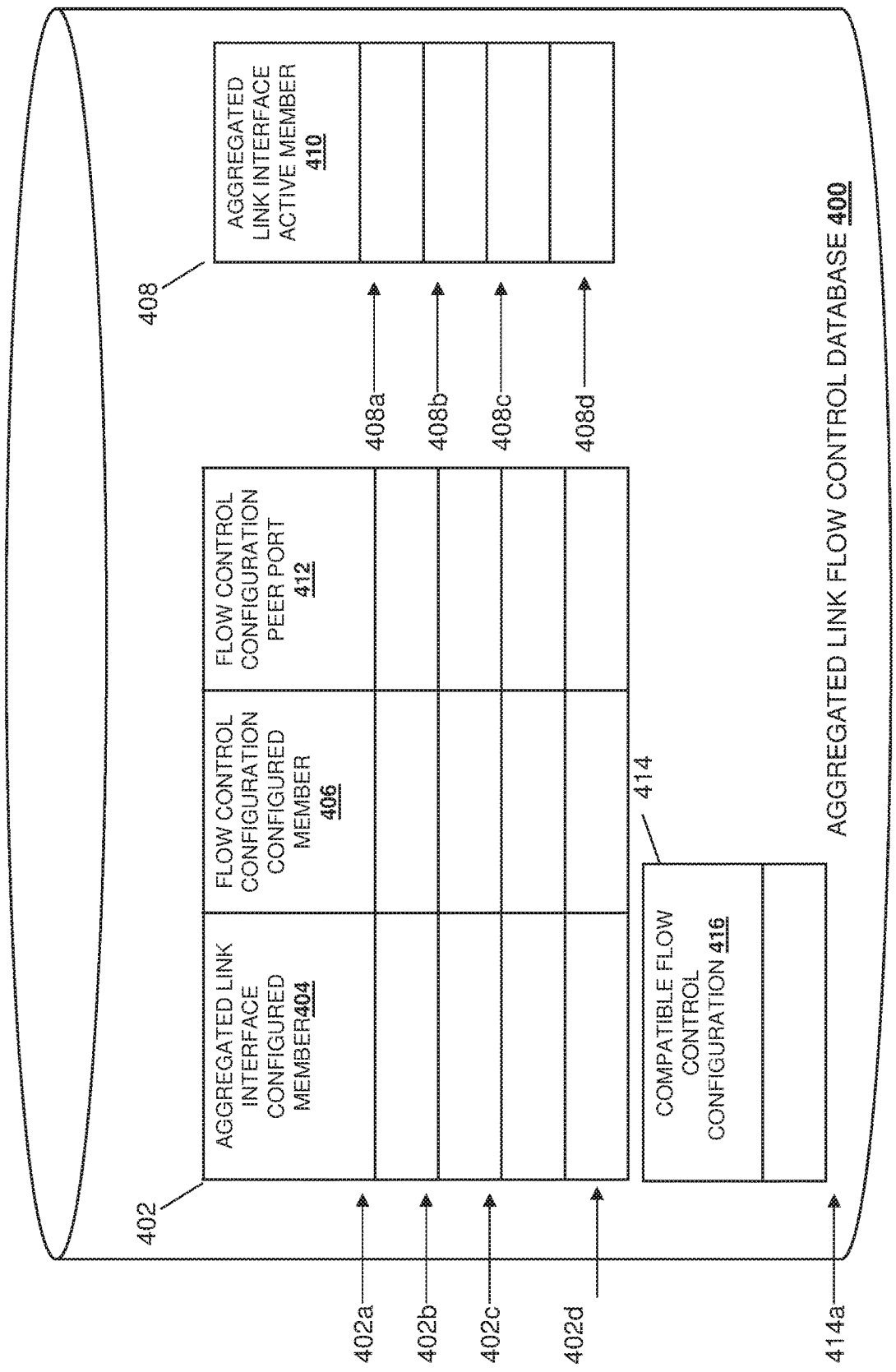
FIG. 4 is a schematic view illustrating an embodiment of an aggregated link flow control database in the networking device of FIG. 3.

Referring now to FIG. 4, an embodiment of an aggregated link flow control database 400 is illustrated. In an embodiment, the aggregated link flow control database 400 may be the aggregated link flow control database 306 discussed above with reference to FIG. 3. In a specific example, the aggregated link flow control database 400 may include an aggregated link interface table 402 that may identify, for example, networking device ports on the networking device 300 that are grouped as an aggregated link interface (e.g., a Link Aggregation Group (LAG), a port channel) in which the networking device ports are members. In the illustrated example, the aggregated link flow control database 400 includes the aggregated link interface table 402 having aggregated link interface table entries 402*a*, 402*b*, 402*c*, and up to 402*d*. For example, for each aggregated link interface table entry 402*a*-*d*, the aggregated link interface table 402 may include an aggregated link configured member column 404, a flow control configuration configured member column 406, a flow control configuration peer port column 412, and/or any other aggregated link interface information that one of skill in the art in possession of the present disclosure would recognize describes ports that are configured members of the aggregated link interface, flow control configurations for those ports, and flow control configurations for peer ports.

In the specific example, the aggregated link flow control database 400 may include an aggregated link interface active member table 408 that may identify, for example, networking device ports on the networking device 300 that are active in the aggregated link interface in which the networking device ports are members. In the illustrated example, the aggregated link interface active member table 408 includes active member aggregated link interface active member table entries 408*a*, 408*b*, 408*c*, and up to 408*d*. For example, for each active member aggregated link table entry 408*a*-*d*, the aggregated link active member table 408 may include an aggregated link interface active member column 410 and/or any other aggregated link configuration information that one of skill in the art in possession of the present disclosure would recognize describes the ports that are active members of the aggregated link and flow control configurations for those ports, as discussed below.

In the specific example, the aggregated link flow control database 400 may include a monitored flow control configuration table 414 that may identify, for example, a monitored flow control configuration for active members of the aggregated links. The monitored flow control configuration table 414 may include a flow control configuration that is compatible with flow control configuration of the ports that are the active members of the aggregated link interface. In the illustrated example, the monitored flow control configuration table 414 includes a monitored flow control configuration table entry 414*a*. For example, the monitored flow control configuration table entry 414*a* in the monitored flow control configuration table 414 may include a compatible flow control configuration column 416 and/or any other monitored flow control configuration information that one of skill in the art in possession of the present disclosure would recognize describes the compatible flow control configuration of the ports that are active members of the aggregated link interface, as discussed below. While a specific example is illustrated, one of skill in the art in possession of the present disclosure will recognize that the aggregated link flow control database 400 may include and/or store other tables and/or information to enable the functionality discussed below while remaining within the scope of the present disclosure.

Figure 5:
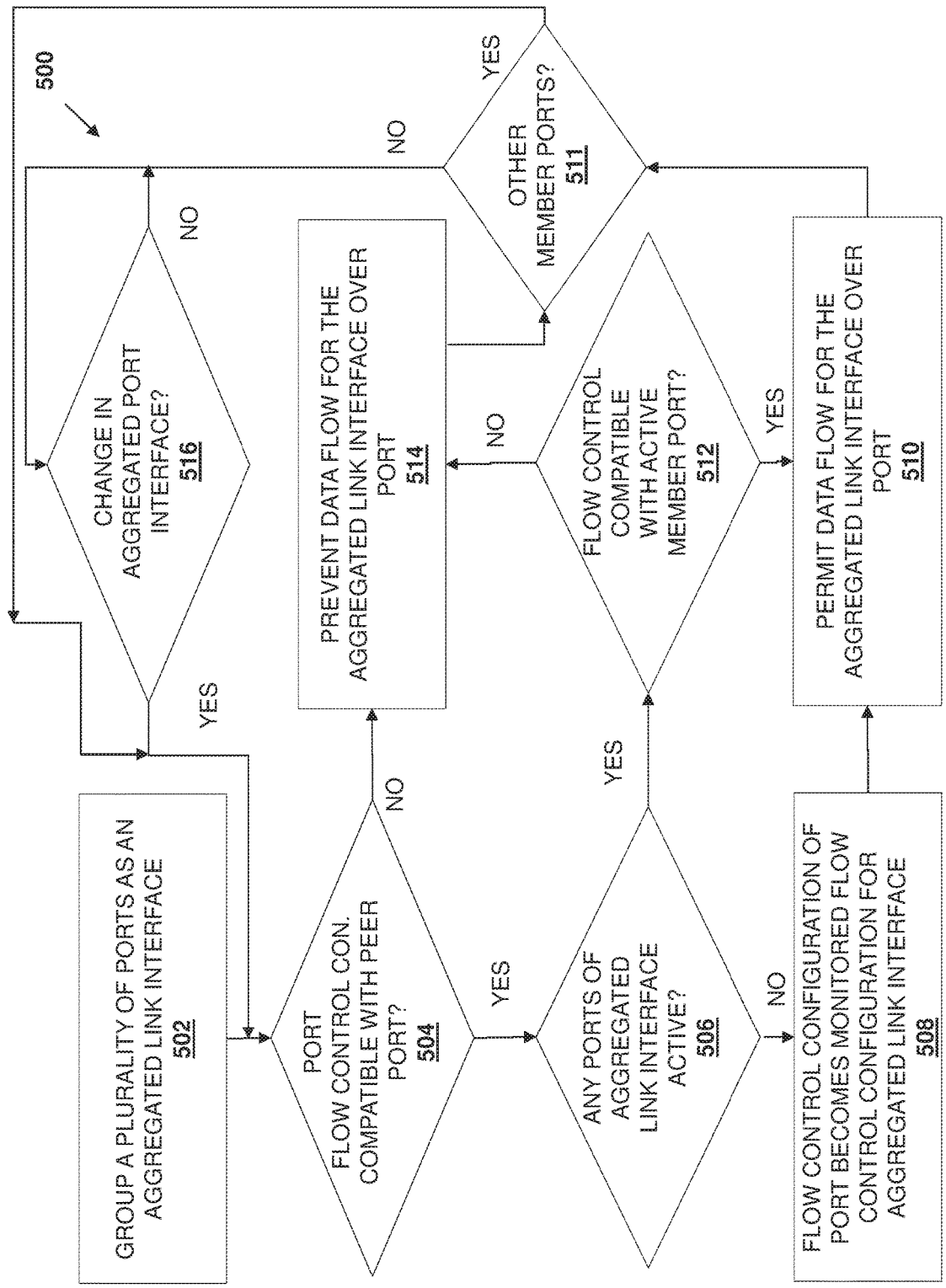
FIG. 5 is a flow chart illustrating an embodiment of a method for aggregated link flow control.

Referring now to FIG. 5, a method 500 for aggregated link flow control is illustrated. As discussed below, the systems and methods of the present disclosure address mismatched flow control configurations of ports that are members of an aggregated link interface (e.g., a Link Aggregation Group (LAG), a port channel, etc.). In some embodiments, preventing mismatched flow control configurations may be achieved by maintaining an aggregated link interface active member table that lists ports of an aggregated link interface that are active ports. The active ports may be ports of the aggregated link interface on which a data flow may be provided, and data flows via the aggregated link interface on ports that are not active ports may be prevented. The excluded member ports may be configured with flow control configurations (e.g., Priority Flow Control (PFC) priorities) that are incompatible with flow control configurations of the active ports in the aggregate link interface, and/or that are incompatible with a peer port of a peer networking device, with that peer port provided by a port to which the member port is connected by a link (e.g., a cable and/or any other coupling system). Ports of the aggregated link interface may be dynamically added or removed from the aggregated link interface active member table (i.e., as active ports) as the flow control configurations of those ports become compatible or incompatible with the flow control configurations of their peer ports, and/or the flow control configurations of the active ports. As such, the aggregated link interface may provide a uniform flow control configuration that ensures similar treatment of a data flow between the ports of the aggregated link interface as that data flow egresses out of the aggregated link interface, irrespective of the individual port of the aggregated link interface it selects. Similar treatment ensures that data flows such as, for example, lossless FCoE traffic that is provided though the aggregated link interface, do not drop at the peer networking device when the flow control configuration for one of the links of the aggregated link interface is disabled or not configured to give priority to a lossless data flow.

The method 500 begins at block 502 where an aggregated link interface is formed. In an embodiment of block 502, the aggregated link flow control engine 304 of the networking device 204/300 may group, trunk, team, bond, or otherwise aggregate physical ports on the networking device 204 into an aggregated link interface. The aggregated link interface may be presented as a single logical interface between two networking devices (e.g., the networking device 204 and the networking device 206) such that network traffic may be shared and/or load balanced among physical ports that are members of the aggregated link interface in order to enhance reliability and decrease network traffic congestion on the any one port between the networking devices. The aggregated link interface may be referred to as a port channel, a Link Aggregation Group (LAG), a port trunk, a link bundle, an Ethernet/network/Network Interface Controller (NIC) bond, a NIC team, or other terminology that would be apparent to one of skill in the art in possession of the present disclosure. The aggregated link flow control engine 304 may utilize a link aggregation protocol to aggregate links such as, for example, Virtual Link Trunking (VLT), an aggregation protocol available from DELL® Inc. of Round Rock, Tex. United States; Link Aggregation Control Protocol (LACP); various Multi-Link Trunking (MLT) protocols; Port Aggregation Protocol (PaGP); EtherChannel; and/or any other link aggregation protocol that would be apparent to one of skill in the art in possession of the present disclosure.

Figure 6A:
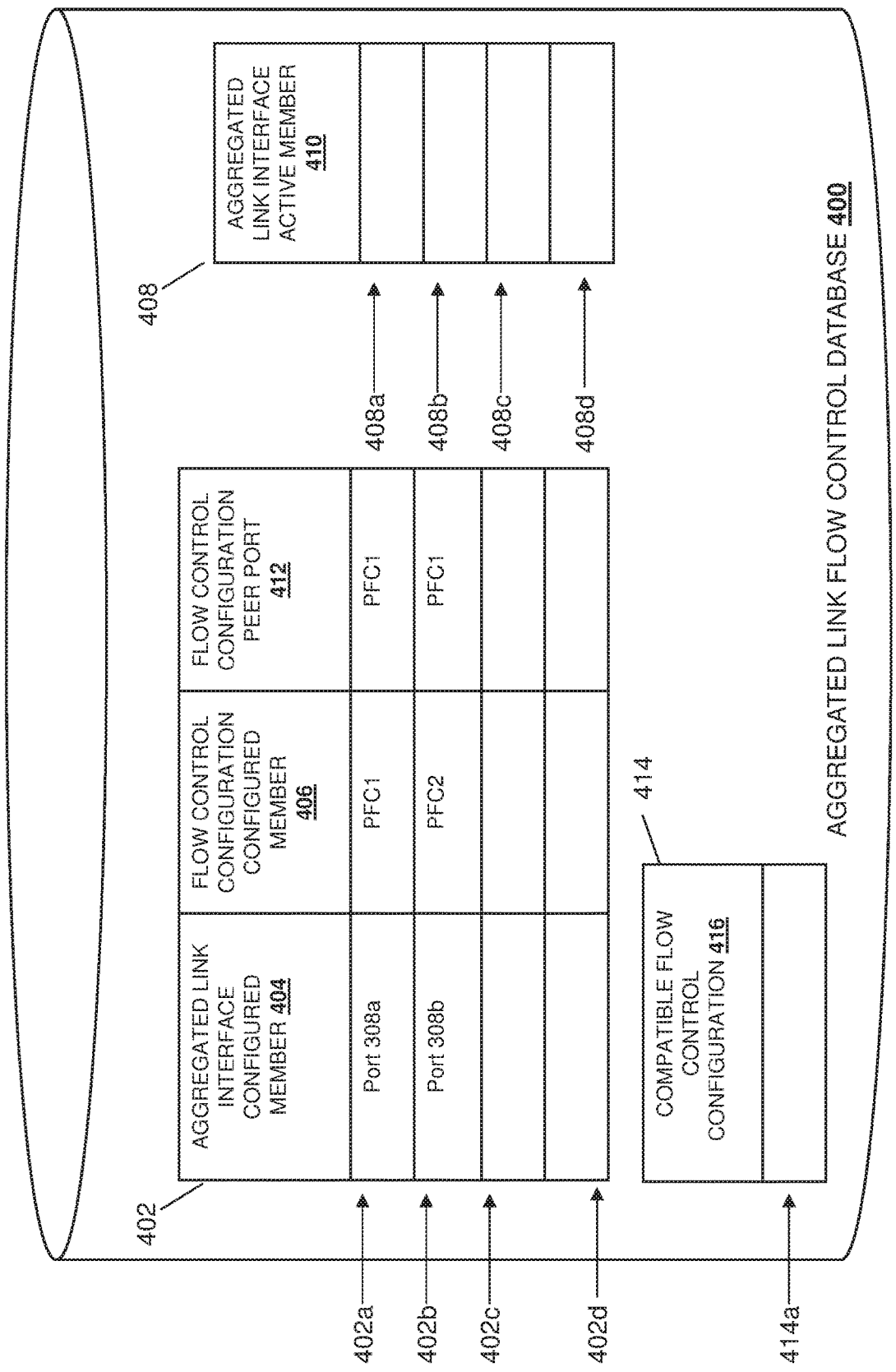
FIG. 6A is a schematic view illustrating an embodiment of information provided in the aggregated link flow control database of FIG. 4 during the method of FIG. 5.
Figure 6B:
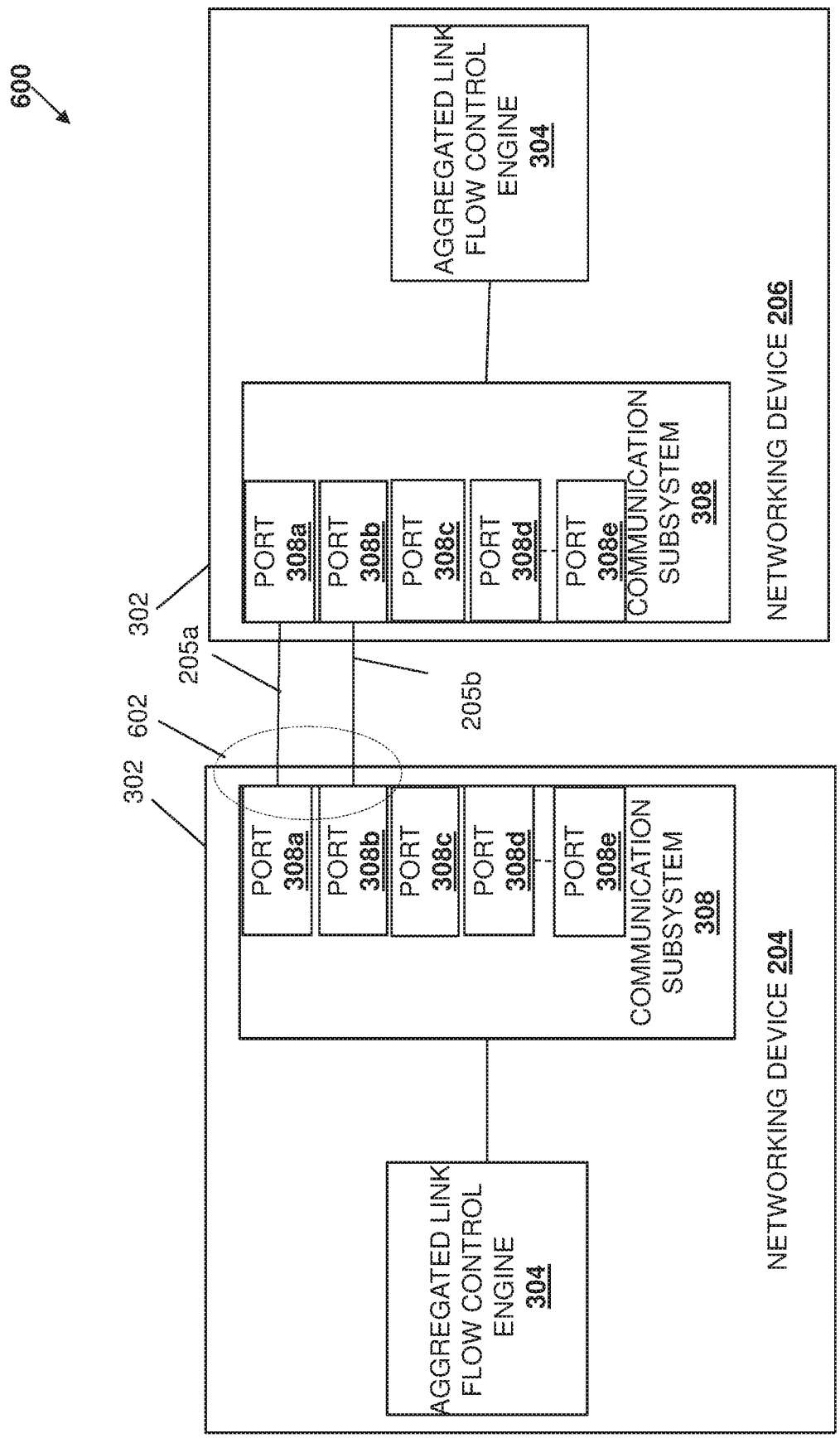
FIG. 6B is a schematic view illustrating an embodiment of the aggregated link flow control system of FIG. 2 according to the aggregated link flow control database of FIG. 6A and during the method of FIG. 5.

In an embodiment of block 502, the aggregated link flow control engine 304 in the networking device 204 may identify ports that are members of the aggregated link interface in the aggregated link interface table 402. Referring to FIG. 6A and FIG. 6B, a specific example of an aggregated link flow control system 600 is illustrated in FIG. 6B that may be the aggregated link flow control system 200 of FIG. 2, and a specific example of the aggregated link flow control database 400 in the networking device 204 is illustrated in 6A. In the specific example, the networking device 204 may group the port 308a and the port 308b of the networking device 204 as an aggregated link interface 602. The port 308a of the networking device 204 may be coupled by the link 205a to the port 308a of the networking device 206. The port 308b of the networking device 204 may be coupled by the link 205b to the port 308b of the networking device 206. The aggregated link flow control engine 304 may store a port identifier of a port that is a member port the aggregated link interface 602 in the aggregated link interface table 402. For example, the aggregated link interface table entry 402a of the aggregated link interface table 402 illustrates how the aggregated link flow control engine 304 may operate to add the port 308a as a configured member of the aggregated link interface by storing the port identifier "Port 308a" in the aggregated link interface configured member column 404. Similarly the aggregated link interface table entry 402b of the aggregated link interface table 402 illustrates how the aggregated link flow control engine 304 may operate to add the port 308b as a configured member of the aggregated link interface by storing the port identifier "Port 308b" in the aggregated link interface configured member column 404.

The method 500 then proceeds to decision block 504 where it is determined whether a flow control configuration of a port that is a member of the aggregated link interface is compatible with a flow control configuration of a peer port. In an embodiment of decision block 504, the aggregated link flow control engine 304 of the networking device 204 may determine whether a flow control configuration of a port of the aggregated link interface is compatible with a flow control configuration of its peer port on the networking device 206. The peer port may be the port on the networking device 206 that is coupled to the port on the networking device 204 that is part of the aggregated link interface. For example, the ports that are coupled via link 205a in FIG. 6B are peer ports with each other, and the ports that are coupled via link 205b in FIG. 6B are peer ports with each other. Each port that is included in the aggregated link interface may be configured to share capabilities and/or configurations with peer ports. For example, each port may have a discovery and capability exchange protocol (e.g., Data Center Bridging eXchange (DCBX)) enabled to convey flow control configurations or other data center bridging capabilities and configurations that would be apparent to one of skill in the art in possession of the present disclosure. The flow control configurations may include a Priority-based Flow Control (PFC) priority (e.g., a dot1p priority 0, a dot1p priority 1, a dot1p priority 2, a dot1p priority 3, a dot1p priority 4, a dot1p priority 5, a dot1p priority 6, a dot1p priority 7, a disabled PFC, and/or other PFC configurations that would be apparent to one of skill in the art in possession of the present disclosure). The aggregated link flow control engine 304 of the networking device 204 may compare the flow control configuration of each port in the aggregated link interface of the networking device 204 to the flow control configuration of each peer port to determine whether the flow control configurations are compatible with each other. As discussed below, matching flow control configurations may be compatible with each other, and/or any other compatible flow control configurations that would be apparent to one of skill in the art.

In an embodiment of decision block 504, the aggregated link flow control engine 304 of the networking device 204 may store the flow control configurations of the ports of the aggregated link interface in the aggregated link interface table 402. Referring again to FIG. 6A and FIG. 6B, the aggregated link flow control engine 304 may store the flow control configuration for each port of the aggregated link interface 602, and the flow control configuration for each peer port, in the aggregated link interface table 402. For example, the aggregated link interface table entry 402a of the aggregated link interface table 402 of FIG. 6A illustrates how the aggregated link flow control engine 304 may operate to add the flow control configuration for the port 308a of the networking device 204 in the flow control configuration configured member column 406 by storing the flow control configuration "PFC1" in the aggregated link interface table entry 402a, and operate to add the flow control configuration for the peer port 308a of the networking device 206 in the flow control configuration peer port column 412 by storing the flow control configuration "PFC1" in the aggregated link interface table entry 402a. Similarly, the aggregated link interface table entry 402b of the aggregated link interface table 402 illustrates how the aggregated link flow control engine 304 may operate to add the flow control configuration for the port 308b of the networking device 204 in the flow control configuration configured member column 406 by storing the flow control configuration "PFC1" in the aggregated link interface table entry 402b, and operate to add the flow control configuration for the peer port 308b of the networking device 206 in the flow control configuration peer port column 412 by storing the flow control configuration "PFC2" in the aggregated link interface table entry 402b. As such, one of skill in the art in possession of the present disclosure will recognize that the flow control configuration of the port 308a of the networking device 204 is compatible with the flow control configuration of the peer port 308a of the networking device 206, while the flow control configuration of the port 308b of the networking device 204 is incompatible with the flow control configuration of the peer port 308b of the networking device 206.

In response to the flow control configuration for the port that is a member of the aggregated link interface being compatible with the flow control configuration of the peer port, the method 500 may proceed to decision block 506 where it is determined whether any of the ports of the aggregated link interface are active. In an embodiment of decision block 506, the aggregated link flow control engine 304 may determine whether any of the ports of the aggregated link interface are active. The ports may be active if a data flow is provided through the port for the aggregated link interface. In an example, the aggregated link flow control engine 304 may reference the aggregated link interface active member table 408 of the aggregated link flow control database 400 to determine whether any of the ports of the aggregated link interface are active. Referring to the specific example of the aggregated link flow control database 400 of FIG. 6A, the aggregated link flow control engine 304 may reference each aggregated link interface active member table entry 408a-408d to determine whether any port identifiers of ports of the aggregated link interface 602 are indicated as active in the aggregated link interface active member column 410. In the illustrated example of FIG. 6A, no port identifiers are provided in the aggregated link interface active member table entries 408a-408d, indicating that the aggregated link interface 602 provides no active ports to provide a data flow.

In response to determining that no ports in the aggregated link interface are active, the method 500 may proceed to block 508 where the flow control configuration of the port that is compatible with its peer port becomes a monitored flow control configuration for the aggregate link interface. In an embodiment of block 508, the aggregated link flow control engine 304 may establish that the flow control configuration of the port of the aggregated link interface, which is compatible with the flow control configuration of the peer port, is the flow control configuration for the aggregated link interface when there are no active ports in the aggregated link interface. When there are no active ports in the aggregated link interface, but there were once active ports such that a previous monitored flow control configuration exists, the previous monitored flow control configuration may be deleted or replaced with the flow control configuration of the port that is now compatible with the flow control configuration of its peer port. As a result, the monitored flow control configuration becomes the flow control configuration that any additional port that is a member of the aggregated link interface must to be compatible with before a data flow is permitted on that port of the aggregated link interface.

The method then proceeds to block 510 where a data flow for the aggregate link interface is permitted to be provided over the port of the aggregated link interface. In an embodiment of block 510, the aggregated link flow control engine 304 may establish that the port of the aggregated link interface is active. Once active, the port of the aggregated link interface may support a data flow (e.g., FCoE traffic). While having compatible flow control configurations between peer devices may be a factor in determining whether to activate a port of the aggregated link interface, other factors may be considered according to the aggregation protocol including, for example, network traffic load, destination identifier in the traffic, source identifier in the network traffic and/or other factors that would be apparent to one of skill in the art in possession of the present disclosure.

Figure 7A:
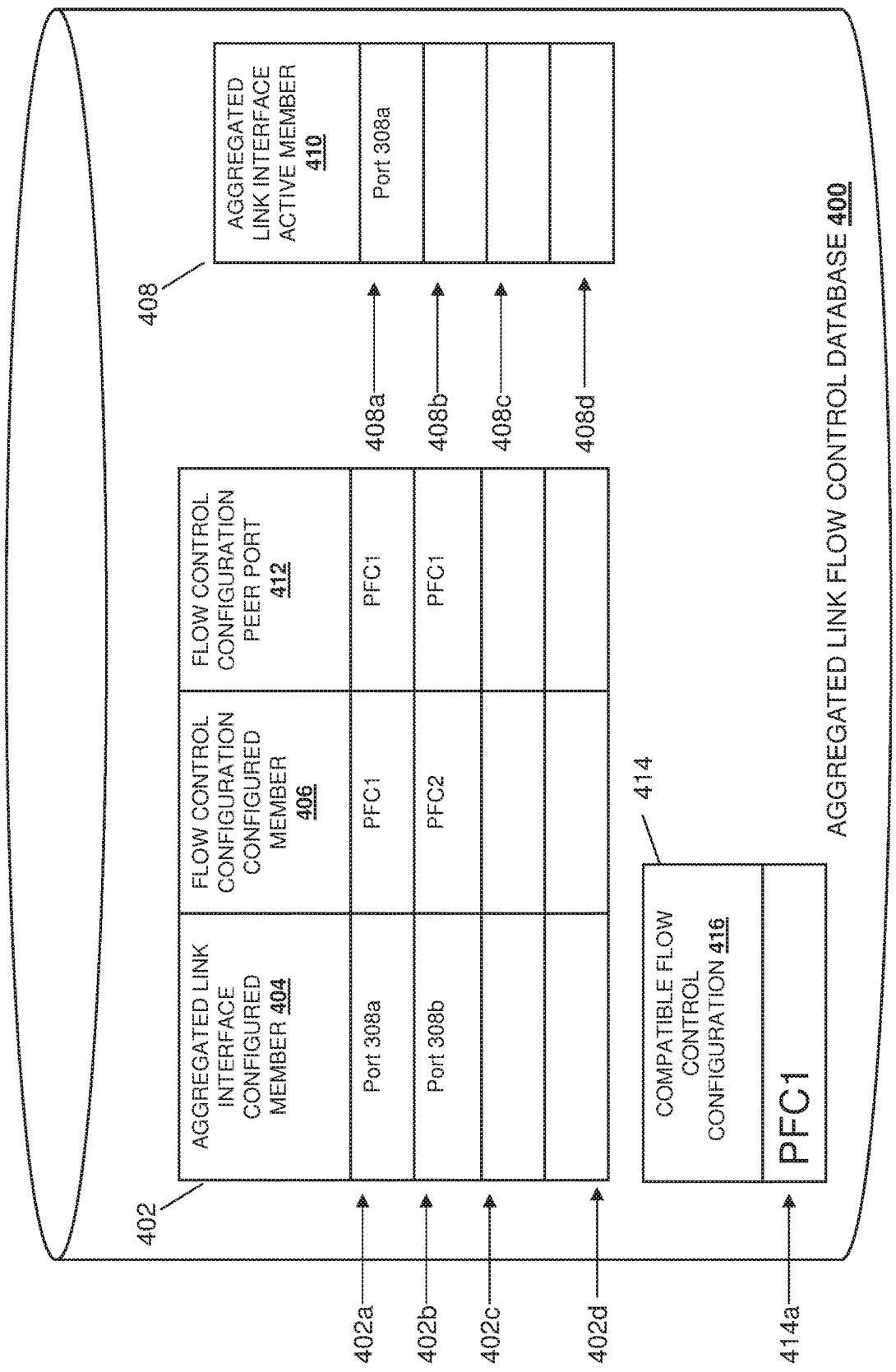
FIG. 7A is a schematic view illustrating an embodiment of information provided in the aggregated link flow control database of FIG. 4 during the method of FIG. 5.
Figure 7B:
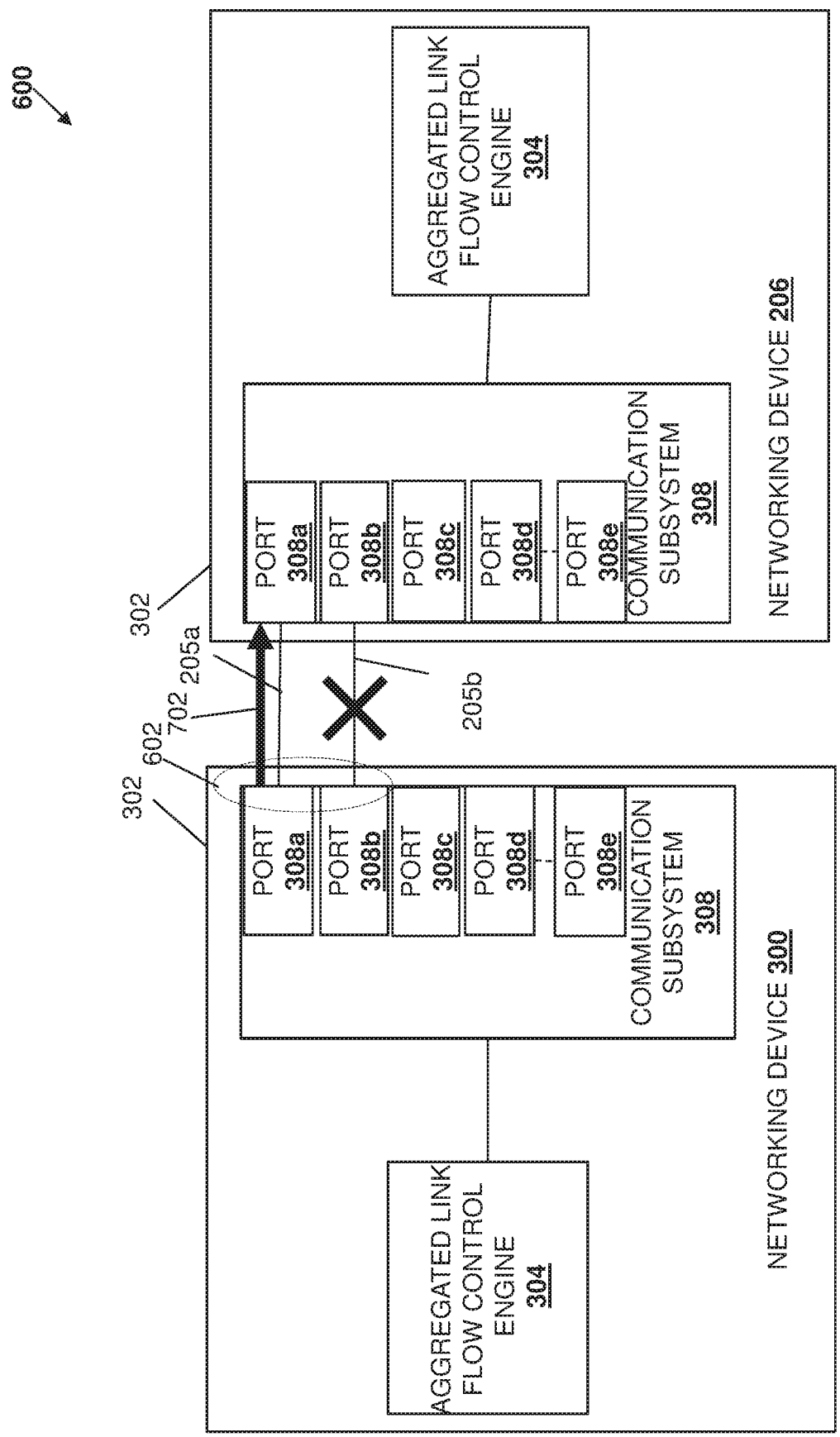
FIG. 7B is a schematic view illustrating an embodiment of a data flow being provided through an aggregated link interface of the aggregated link flow control system of FIG. 2 according to the aggregated link flow control database of FIG. 7A and during the method of FIG. 5.

In an embodiment of blocks 508 and 510, the aggregated link flow control engine 304 of the networking device 204 may set the ports of the aggregated link interface that are determined to be active (according in the aggregated link interface active member table 408), and set a monitored flow control configuration of the aggregated link interface in the monitored flow control configuration table 414. Referring now to FIG. 7A and FIG. 7B, the specific example of the aggregated link flow control system 600 of 6B and the specific example of the aggregated link flow control database 400 of the networking device 204 provided above in FIG. 6A is continued. In the specific example, the aggregated link flow control engine 304 may set the port 308a as an active port of the aggregated link interface 602 by, for example, storing the port identifier for the port 308a of the aggregated link interface 602 in the aggregated link interface active member table 408. For example, the aggregated link interface active member table entry 408a of the aggregated link interface active member table 408 illustrates how the aggregated link flow control engine 304 may operate to add the port 308a as an active port of the aggregated link interface 602 in the aggregated link interface active member column 410 by storing the port identifier "Port 308a."

Furthermore, the aggregated link flow control engine 304 may store the flow control configuration of the port 308a in the monitored flow control configuration table 414. Because the port 308a is the first port to be added to the aggregated link interface active member table 408, the flow control configuration of the port 308a may be set as a monitored flow control configuration. For example, the monitored flow control configuration table entry 414a of the monitored flow control configuration table 414 illustrates how the aggregated link flow control engine 304 may operate to add the flow control configuration of the port 308a of the networking device 204 as the monitored flow control configuration for the aggregated link interface 602 by storing the flow control configuration "PFC1" in the compatible flow control configuration column 416. Once activated, a data flow 702 may be provided over the port 308a of the networking device 204 via the link 205a to port 308a of the networking device 206.

The method 500 may then proceed to decision block 511 where it is determined whether there are any additional ports of the aggregated link interface need to be checked to determine whether those ports can support a data flow for the aggregated link interface. In an embodiment, the aggregated link flow control engine 304 may determine whether all of the ports of the aggregated link interface have been processed to determine whether those ports can be deemed ports that are active members of the aggregate link interface so that the data flow for the aggregated link interface can be provide on those other ports. If there are additional ports of the aggregated link interface, the method 500 may proceed back to decision block 504 to check the next port of the aggregated link interface. For example, the aggregated link flow control engine 304 may determine from the aggregate link interface table 402 that port 308b of the networking device 204 is included on the aggregated link interface 602 and needs to be processed to determine whether the port 308b can provide the data flow 702 for the aggregated link interface 602.

Referring back to decision block 504 of the method 500, in response to the flow control configuration of the port of the aggregated link interface being incompatible with the flow control configuration of the peer port, the method 500 may proceed to block 514 where the data flow for the aggregated link interface is prevented from being provided over the port. In an embodiment of block 514, the aggregated link flow control engine 304 may prevent a data flow from being provided over the port that includes a flow control configuration that is not compatible with the flow control configuration of its peer port. Referring to the specific example in FIG. 7A and FIG. 7B, the aggregated link flow control engine 304 may determine from the aggregated link interface table entry 402b of the aggregated link interface table 402 that the port 308b on the networking device 204 has a mismatch in flow control configurations with its peer port 308b on the networking device 206. As such, the aggregated link flow control engine 304 will not provide the port identifier of the port 308b in the aggregated link interface active member table 408, which prevents the data flow 702 of the aggregated link interface 602 from being provided over the port 308b. The method 500 then proceeds to decision block 511.

If, at decision block 511, it is determined that there are no other ports in the aggregated link interface that need to be checked to determine whether the port can provide the data flow for the aggregate link interface, the method 500 may proceed to decision block 516 where it is determined whether there is a change to the aggregated link interface. In an embodiment of decision block 516, the aggregated link flow control engine 304 may determine whether there is a change to the aggregated link interface. For example, a change to the aggregated link interface may be a change in the flow control configuration of a port in the aggregated link interface, a change in the flow control configuration of a peer port for a port in the aggregated link interface, an addition of a port to the aggregate link interface, a removal of a port from the aggregate link interface, and/or any other change that would be apparent to one of skill in the art in possession of the present disclosure. If there are no changes to the aggregated link interface, the method 500 may proceed to monitor for changes to the aggregated link interface. If there are changes to the aggregated link interface, the method 500 may proceed to back to decision block 504.

Figure 8A:
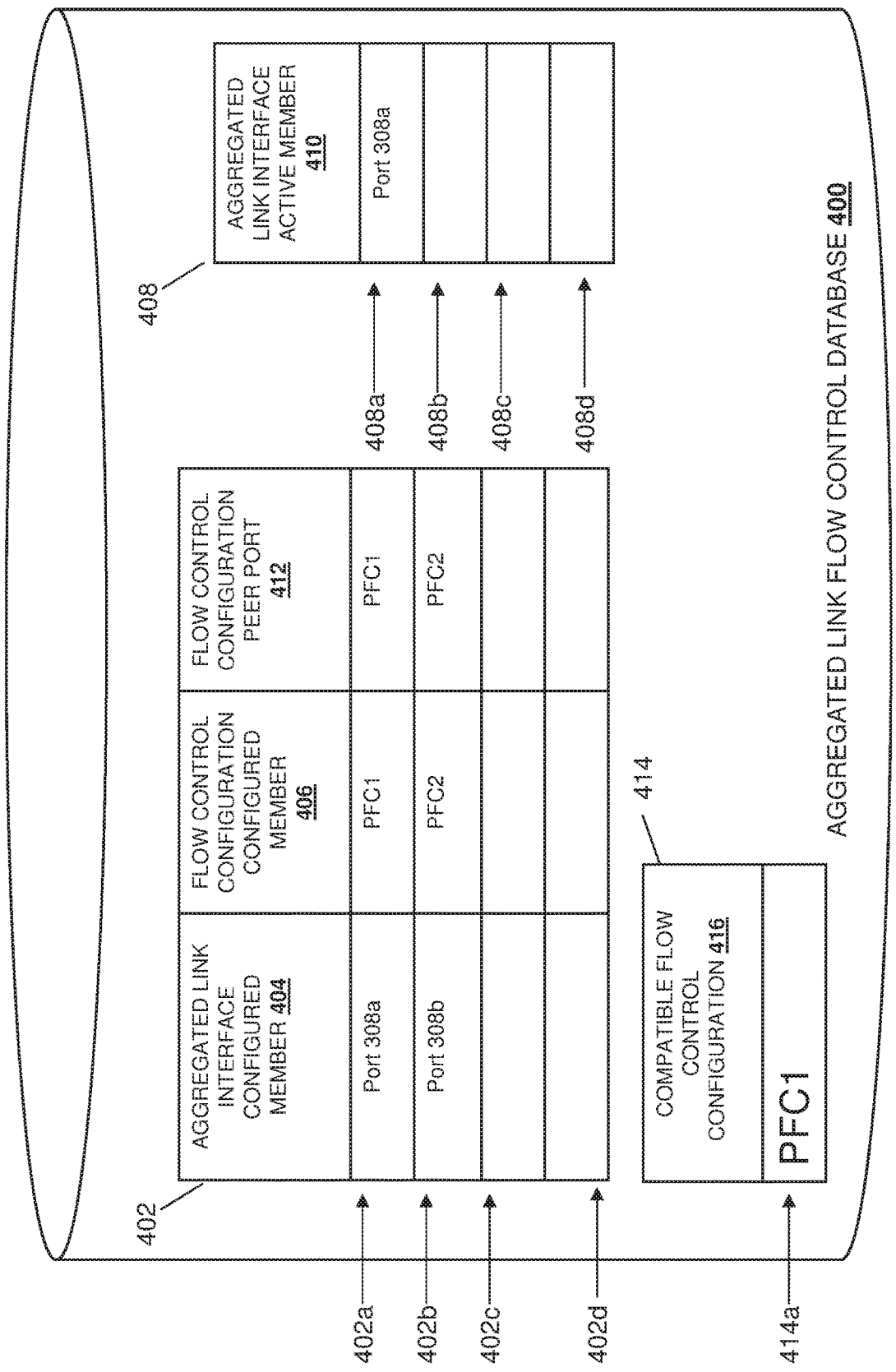
FIG. 8A is a schematic view illustrating an embodiment of information provided in the aggregated link flow control database of FIG. 4 during the method of FIG. 5.
Figure 8B:
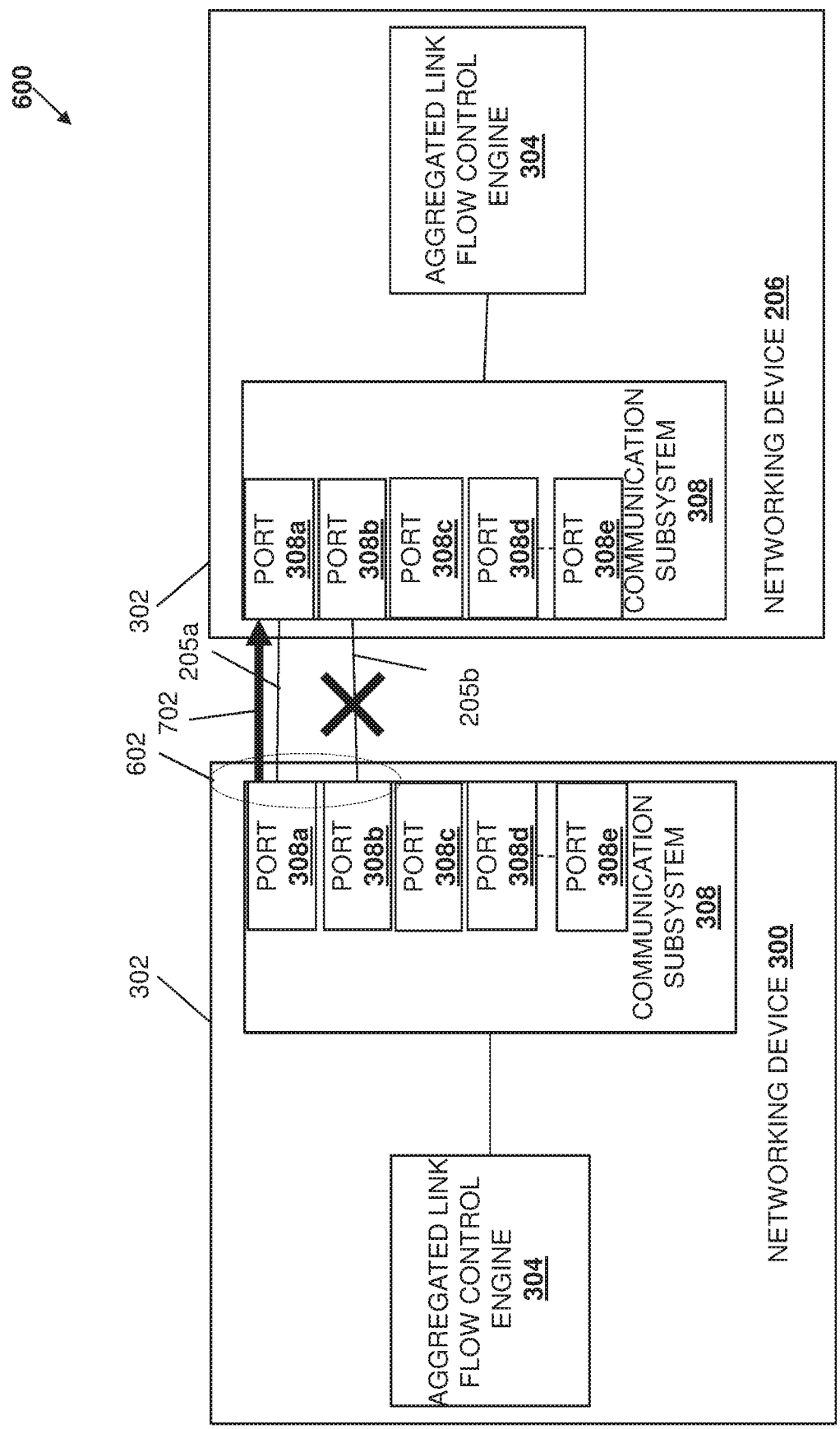
FIG. 8B is a schematic view illustrating an embodiment of a data flow being provided through an aggregated link interface of the aggregated link flow control system of FIG. 2 according to the aggregated link flow control database of FIG. 8A and during the method of FIG. 5.

In an embodiment of decision block 516, and with reference to FIG. 8A and FIG. 8B, a continuation of the specific example of the aggregated link flow control system 600 illustrated in 7B, and the specific example of the aggregated link flow control database 400 of the networking device 204 illustrated in FIG. 7A, is provided. The aggregated link flow control engine 304 of the networking device 204 may determine from the aggregated link interface table 402 that the flow control configuration of the peer port 308b of the networking device 206 has changed to "PFC2." Because the flow control configuration ("PFC2") of the peer port 308b of the networking device 206 now corresponds or matches the flow control configuration ("PFC2") of the port 308b of the networking device 204, the method 500 may proceed from decision block 504 to decision block 506. At decision block 506, the aggregated link flow control engine 304 may determine that the port 308a is active such that the data flow 702 for the aggregated link interface 602 is being provided over the port 308a on the networking device 204 to the port 308b on the networking device 206.

In response to a port of the aggregated link interface being active, the method 500 may proceed to decision block 512 where it is determined whether the flow control configuration of the port on the aggregated link interface, which is compatible with the flow control configuration of its peer port, is also compatible with the flow control configuration of the port of the aggregated link interface that is active so that a data flow may be provided on the aggregated link interface. In an embodiment of decision block 512, and with reference to FIGS. 8A and 8B, the aggregated link flow control engine 304 may determine whether the flow control configuration of the port 308b on the networking device 204 that is included in the aggregated link interface 602 is compatible with the flow control configuration of the port 308a on the aggregated link interface 602 that is active and providing the data flow 702 for the aggregated link interface 602. If, at decision block 512, the flow control configuration of a port of the aggregated link interface is compatible, then the method 500 may proceed to block 510 as discussed above. If, at decision block 512, the flow control configuration of the port of the aggregated link interface is incompatible, then the method 500 may proceed to block 514 as discussed above. In the specific example in FIG. 8A and FIG. 8B, the aggregated link flow control engine 304 may determine that the flow control configuration "PFC1" of the port 308a of the aggregated link interface 602 does not match or is otherwise incompatible with the flow control configuration "PFC2" of the port 308b. As such, the method 500 may proceed to block 514, and the port 308b is not provided in the aggregated link interface active member table 408 so that the data flow 702 for the aggregated link interface 602 is blocked at the port 308b (but provided over the port 308a.)

Figure 9A:
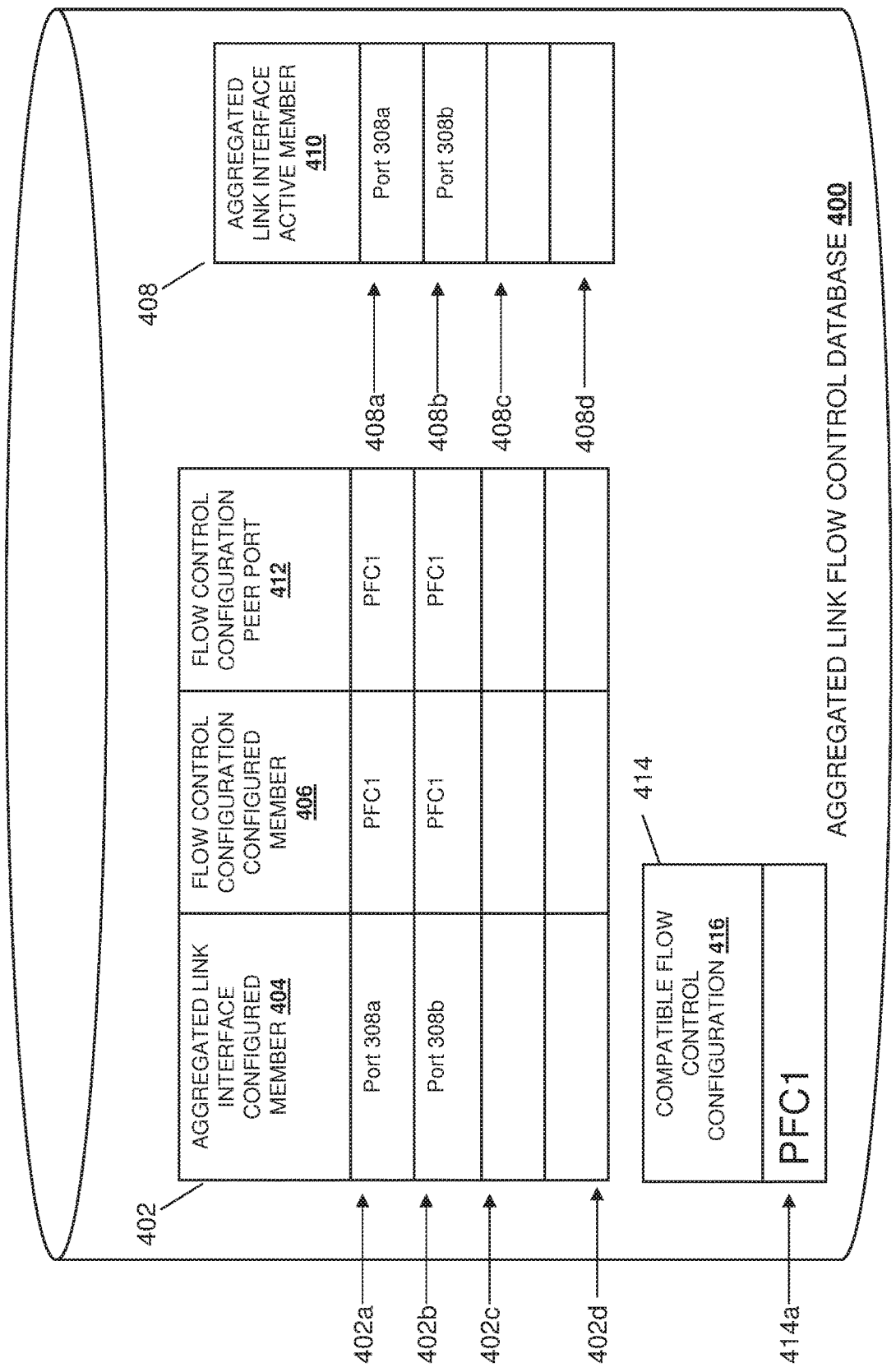
FIG. 9A is a schematic view illustrating an embodiment of information provided in the aggregated link flow control database of FIG. 4 during the method of FIG. 5.
Figure 9B:
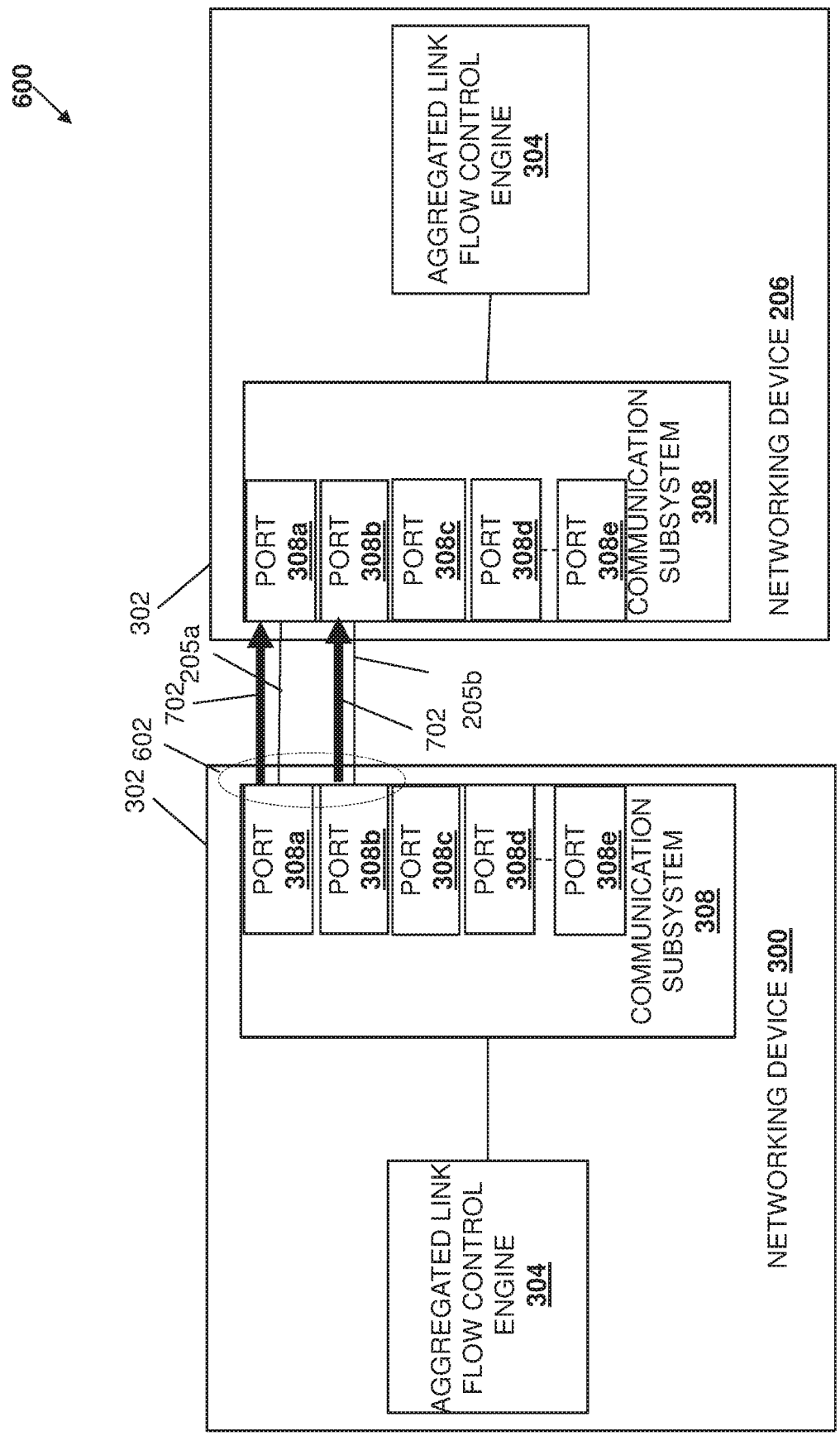
FIG. 9B is a schematic view illustrating an embodiment of a data flow being provided through an aggregated link interface of the aggregated link flow control system of FIG. 2 according to the aggregated link flow control database of FIG. 9A and during the method of FIG. 5.

In an embodiment of decision block 516, and with reference to FIG. 9A and FIG. 9B, a continuation of the specific example of the aggregated link flow control system 600 illustrated in FIG. 7B and the specific example of the aggregated link flow control database 400 of the networking device 204 illustrated in FIG. 7A, is provided. The aggregated link flow control engine 304 on the networking device 204 may determine from the aggregated link interface table 402 that the flow control configuration of the port 308b of the aggregated link interface 602 on the networking device 204 has changed to "PFC1." Because the flow control configuration ("PFC1") of peer port 308b of the networking device 206 now corresponds or matches the flow control configuration ("PFC1") of the port 308b of the networking device 204, the method 500 may proceed from decision block 504 to decision block 506. At decision block 506, the aggregated link flow control engine 304 may determine that a port of the aggregated link interface 602 (e.g., port 308a) is active, and the data flow 702 for the aggregated link interface 602 is being provided over the port 308a of the networking device 204 to the port 308b of the networking device 206 via the link 205a.

In response to determining that a port of the aggregated link interface is active at decision block 506, the method 500 may proceed to decision block 512, as discussed above. In an embodiment of decision block 512, and with reference to FIGS. 9A and 9B, the aggregated link flow control engine 304 may determine whether the flow control configuration of the port 308b of the aggregated link interface 602 on the networking device 204, which is compatible with the flow control configuration of its peer port 308b on the networking device 206, is compatible with the flow control configuration of the port 308a of the aggregated link interface 602 that is active and providing the data flow 702 for the aggregated link interface 602. The aggregated link flow control engine 304 may reference the monitored flow control configuration in the monitored flow control configuration table 414 to determine the compatible flow control configuration. In the specific example, the flow control configuration "PFC1" of the port 308a may be provided in the monitored flow control configuration table 414. The aggregated link flow control engine 304 may determine that the flow control configuration "PFC1" for the port 308a of the aggregated link interface 602 matches or is otherwise compatible with the flow control configuration "PFC1" of the port 308b. As such, the method 500 may proceed to block 510 where the port 308b is provided as an active port and added to the aggregated link interface active member table 408. The data flow 702 for the aggregated link interface 602 is then provided over the port 308b, and provided over the port 308a, according to a load balancing algorithm provided by the aggregated link flow control engine 304.

Figure 10A:
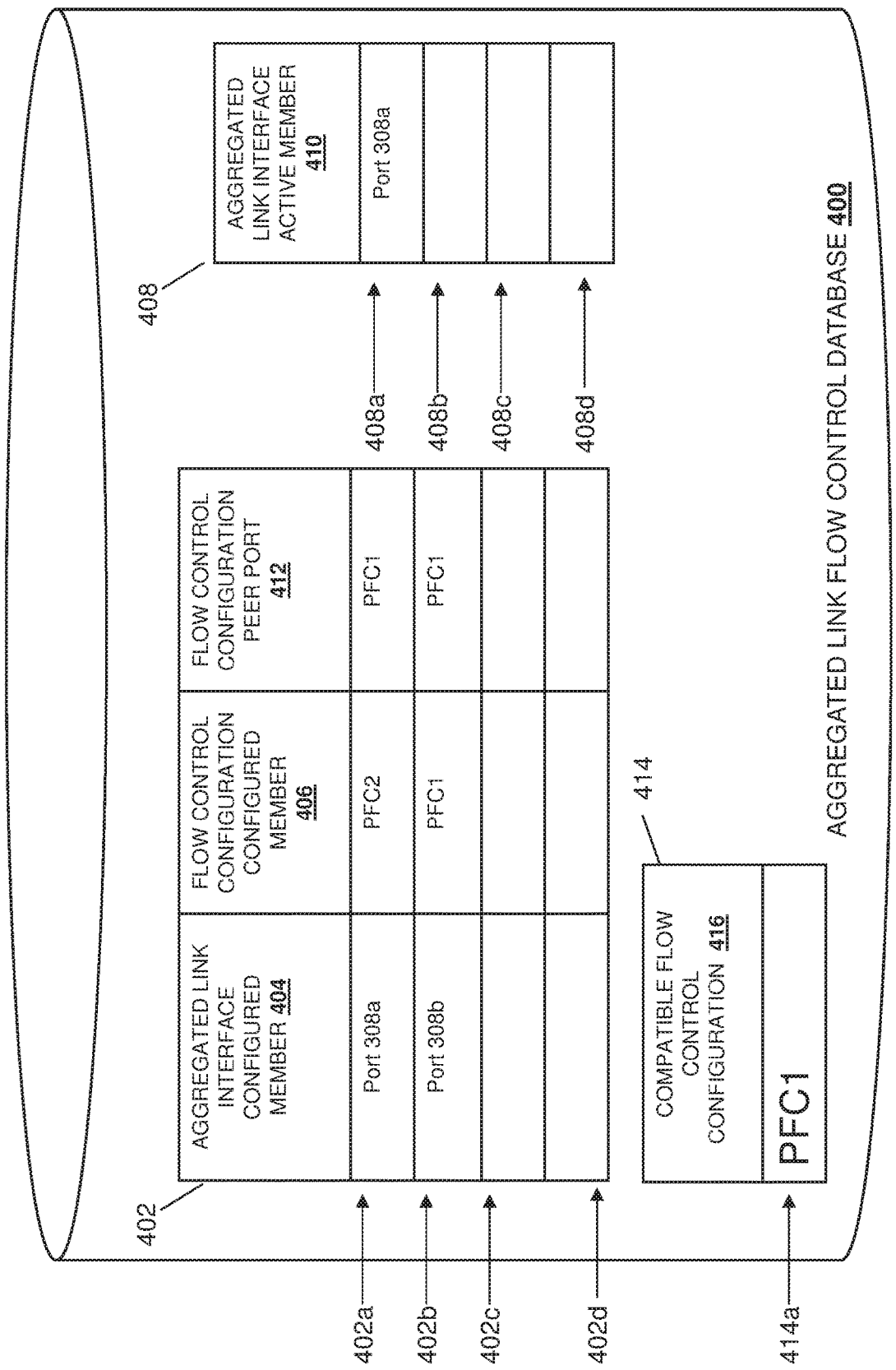
FIG. 10A is a schematic view illustrating an embodiment of information provided in the aggregated link flow control database of FIG. 4 during the method of FIG. 5.
Figure 10B:
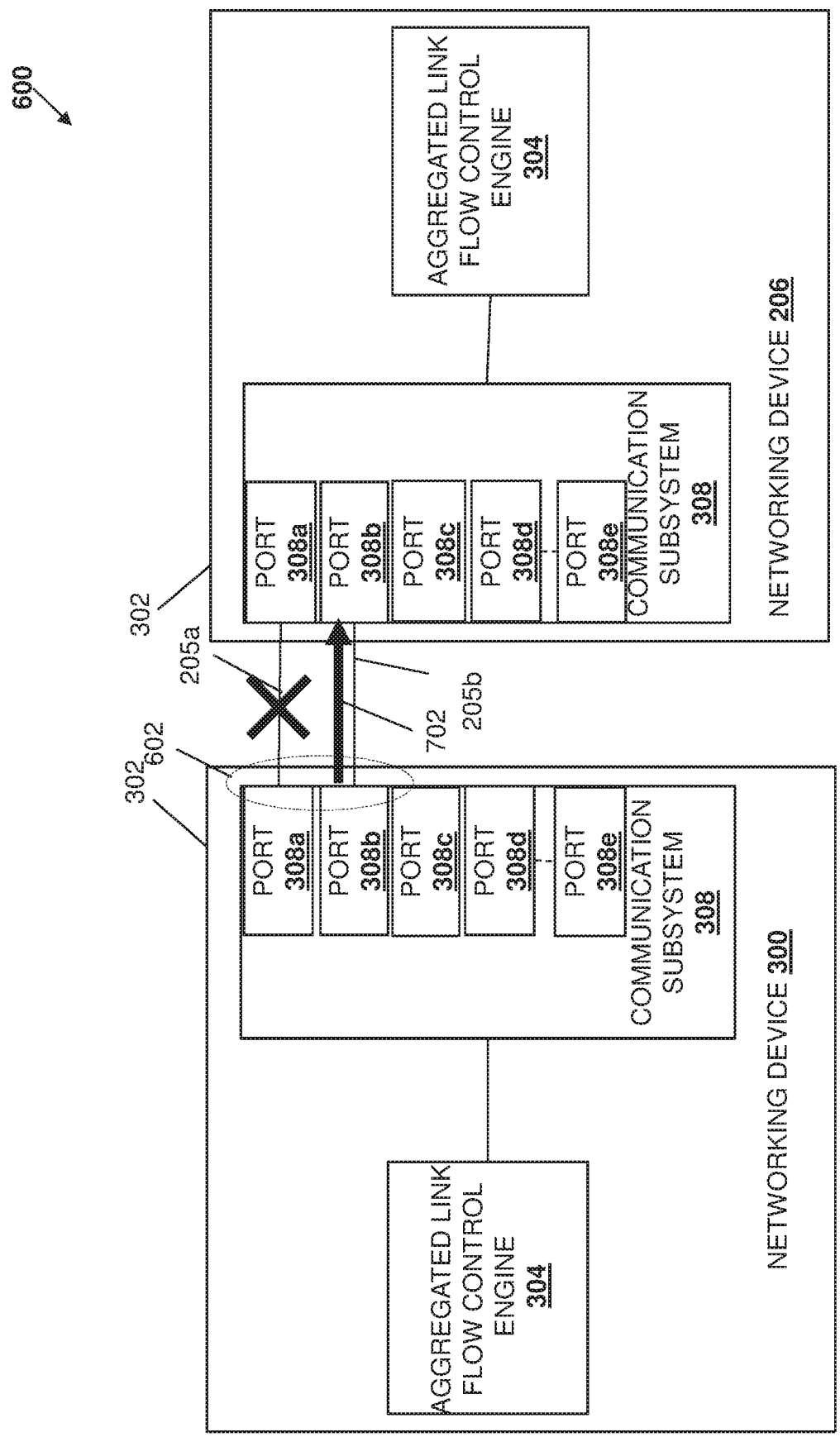
FIG. 10B is a schematic view illustrating an embodiment of a data flow being provided through an aggregated link interface of the aggregated link flow control system of FIG. 2 according to the aggregated link flow control database of FIG. 10A and during the method of FIG. 5.

In an embodiment of decision block 516, and with reference to FIG. 10A and FIG. 10B, a continuation of the specific example of the aggregated link flow control system 600 illustrated in FIG. 9B and the specific example of the aggregated link flow control database 400 of the networking device 204 illustrated in FIG. 9A, is illustrated. The aggregated link flow control engine 304 of the networking device 204 may determine from aggregated link interface table 402 that the flow control configuration of the port 308a of the aggregated link interface 602 on the networking device 204 has changed to "PFC2." Because the flow control configuration ("PFC1") of peer port 308a on the networking device 206 is now mismatched or is otherwise incompatible with that flow control configuration ("PFC2") of the port 308a on the networking device 204, the method 500 may proceed from decision block 504 to block 514, as discussed above. As such, in the specific example, the aggregated link flow control engine 304 may prevent the data flow 702 on the port 308a on the networking device 204 by removing the port identifier "Port 308a" from the aggregated link interface active member table entry 408a of the aggregated link interface active member table 408.

In various embodiments, at decision block 516, ports of the aggregated link interface may be added and removed. As such, entries for removed ports may be cleared in the aggregate link interface table 402 and the aggregated link interface active member table 408. If a port is added to the aggregated link interface (e.g., a link between the port 308c of the networking device 204 and the port 308c of the networking device 206 is provided), then the aggregated link flow control engine 304 may determine whether the flow control configuration of the port added to the aggregated link interface is compatible with the flow control configuration of its peer port, and is also compatible with the flow control configuration of the active port(s) of the aggregated link interface, according to method 500. While specific examples and scenarios of method 500 are illustrated, one of skill in the art would recognize that other examples may be implemented to the method 500 without departing from the scope of the present disclosure.

Thus, systems and methods have been described that address mismatched flow control configurations of ports in an aggregated link interface by preventing ports of the aggregated link interface from providing a data flow when those ports are incompatible with their peer ports and/or active ports in the aggregated link interface. This may be achieved by exchanging flow control configurations between networking devices to determine whether flow control configuration incompatibility exists between peer ports of the networking devices. Furthermore, each networking device may determine whether flow control configuration incompatibility exists between ports of an aggregated link interface that each networking device provides. As such, consistent data flows through an aggregated link interface may be established such that lossless network traffic is not dropped at the networking device receiving the network traffic, and is provided over the aggregated link interface in a consistent manner regardless of link of the aggregated link interface on which the network traffic is provided.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An aggregated link flow control system, comprising:
   a first networking device having a plurality of peer ports; and
   a second networking device that includes:
   a first port having a first flow control configuration, wherein the first port is coupled to the first networking device via a first peer port of the plurality of peer ports on the first networking device; and
   a second port having a second flow control configuration, wherein the second port is coupled to the first networking device via a second peer port of the plurality of peer ports, and wherein the second networking device is configured to:
group the first port and the second port as an aggregated link interface; and
determine that the first flow control configuration of the first port is compatible with a third flow control configuration of the first peer port such that the first flow control configuration of the first port and the third flow control configuration of the first peer port provide for the handling of a first network traffic type consistently and, in response, provide a data flow having the first network traffic type for the aggregated link interface through the first port.

2. The system of claim 1, wherein the second networking device is further configured to:
determine that the second flow control configuration of the second port is compatible with a fourth flow control configuration of the second peer port, and that the second flow control configuration of the second port corresponds with the first flow control configuration of the first port and, in response, provide the data flow for the aggregated link interface through the second port.

3. The system of claim 2, wherein the second networking device is further configured to:
determine that one of:
the second flow control configuration of the second port has changed to a fifth flow control configuration that does not correspond with the first flow control configuration of the first port; and
the fourth flow control configuration of the second peer port has changed to a fifth flow control configuration that is incompatible with the second flow control configuration; and
prevent, in response to the incompatibility, the data flow for the aggregated link interface from being provided through the second port.

4. The system of claim 1, wherein the second networking device is further configured to:
determine that the second flow control configuration of the second port is incompatible with a fourth flow control configuration of the second peer port and, in response, prevent the data flow for the aggregated link interface from being provided through the second port.

5. The system of claim 1, wherein the second networking device is further configured to:
determine that the second flow control configuration of the second port does not correspond with the first flow control configuration of the first port and, in response, prevent the data flow for the aggregated link interface from being provided through the second port.

6. The system of claim 1, wherein the second networking device further includes a third port having a fourth flow control configuration, wherein the third port is coupled to a third peer port of the plurality of peer ports, wherein the second networking device is configured to:
add the third port to the aggregated link interface; and
determine that the fourth flow control configuration of the third port is compatible with a fifth flow control configuration of the third peer port, and that the fourth flow control configuration corresponds with the first flow control configuration of the first port and, in response, provide the data flow for the aggregated link interface through the third port.

7. The system of claim 1, wherein the second networking device is further configured to:
set the first flow control configuration as a monitored flow control configuration.

8. The system of claim 7, wherein the second networking device is further configured to:
determine that the first flow control configuration is incompatible with the third flow control configuration and, in response:
prevent the data flow for the aggregated link interface from being provided through the first port; and
remove the first flow control configuration as the monitored flow control configuration; and
determine that the second port is not providing the data flow for the aggregated link interface and, in response, remove the first flow control configuration as the monitored flow control configuration.

9. An information handling system (IHS), comprising:
a plurality of ports;
a processing system that is coupled to the plurality of ports; and
a memory system that is coupled to the processing system and that includes instructions that, when executed by the processing system, cause the processing system to provide an aggregated link flow control engine that is configured to:
add a first port of the plurality of ports having a first flow control configuration to an aggregated link interface, wherein the first port is coupled to a first networking device via a first peer port of a plurality of peer ports on the first networking device;
add a second port of the plurality of ports having a second flow control configuration to the aggregated link interface, wherein the second port is coupled to the first networking device via a second peer port of the plurality of peer ports; and
determine that the first flow control configuration of the first port is compatible with a third flow control configuration of the first peer port such that the first flow control configuration of the first port and the third flow control configuration of the first peer port provide for the handling of a first network traffic type consistently and, in response, provide a data flow having the first network traffic type for the aggregated link interface through the first port.

10. The IHS of claim 9, wherein the aggregated link flow control engine is further configured to:
determine that the second flow control configuration of the second port is compatible with a fourth flow control configuration of the second peer port, and that the second flow control configuration of the second port corresponds with the first flow control configuration of the first port and, in response, provide the data flow for the aggregated link interface through the second port.

11. The IHS of claim 10, wherein the aggregated link flow control engine is further configured to:
determine that one of:
the second flow control configuration of the second port has changed to a fifth flow control configuration that does not correspond with the first flow control configuration of the first port; and
the fourth flow control configuration of the second peer port has changed to a fifth flow control configuration that is incompatible with the second flow control configuration; and
prevent, in response to the incompatibility, the data flow for the aggregated link interface from being provided through the second port.

12. The IHS of claim 9, wherein the aggregated link flow control engine is further configured to:
  determine that the second flow control configuration of the second port is incompatible with a fourth flow control configuration of the second peer port and, in response, prevent the data flow for the aggregated link interface from being provided through the second port.

13. The IHS of claim 9, wherein the aggregated link flow control engine is further configured to:
  determine that the second flow control configuration of the second port does not correspond with the first flow control configuration of the first port and, in response, prevent the data flow for the aggregated link interface from being provided through the second port.

14. The IHS of claim 9, wherein the aggregated link flow control engine is further configured to:
  add a third port of the plurality of ports having a fourth flow control configuration to an aggregated link interface, wherein the third port is coupled to the first networking device via a third peer port of the plurality of peer ports on the first networking device; and
  determine that the fourth flow control configuration of the third port is compatible with a fifth flow control configuration of the third peer port, and that the fourth flow control configuration corresponds with the first flow control configuration of the first port and, in response, provide the data flow for the aggregated link interface through the third port.

15. The IHS of claim 9, wherein the aggregated link flow control engine is further configured to:
  set the first flow control configuration as a monitored flow control configuration.

16. The IHS of claim 15, wherein the aggregated link flow control engine is further configured to:
  determine that the first flow control configuration is incompatible with the third flow control configuration and, in response, prevent the data flow for the aggregated link interface from being provided through the first port; and
  determine that the second port is not providing the data flow for the aggregated link interface and, in response, remove the first flow control configuration as the monitored flow control configuration.

17. A method for aggregated link flow control, comprising:
  adding, by a first networking device that includes a plurality of ports, a first port of the plurality of ports having a first flow control configuration to an aggregated link interface, wherein the first port is coupled to a second networking device via a first peer port of a plurality of peer ports on the second networking device;
  adding, by the first networking device, a second port of the plurality of ports having a second flow control configuration to the aggregated link interface, wherein the second port is coupled to the second networking device via a second peer port of the plurality of peer ports; and
  determining, by the first networking device, that the first flow control configuration of the first port is compatible with a third flow control configuration of the first peer port such that the first flow control configuration of the first port and the third flow control configuration of the first peer port provide for the handling of a first network traffic type consistently and, in response, provide a data flow having the first network traffic type for the aggregated link interface through the first port.

18. The method of claim 17, further comprising:
  determining, by the first networking device, that the second flow control configuration of the second port is compatible with a fourth flow control configuration of the second peer port, and that the second flow control configuration of the second port corresponds with the first flow control configuration of the first port and, in response, provide the data flow for the aggregated link interface through the second port.

19. The method of claim 18, further comprising:
  determining, by the first networking device, that one of:
    the second flow control configuration of the second port has changed to a fifth flow control configuration that does not correspond with the first flow control configuration of the first port; and
    the fourth flow control configuration of the second peer port has changed to a fifth flow control configuration that is incompatible with the second flow control configuration; and
  preventing, by the first networking device and in response to the incompatibility, the data flow for the aggregated link interface from being provided through the second port.

20. The method of claim 17, further comprising:
  determining, by the first networking device, that the second flow control configuration of the second port is incompatible with a fourth flow control configuration of the second peer port and, in response, prevent the data flow for the aggregated link interface from being provided through the second port.

* * * * *